(No Model.)

6 Sheets—Sheet 1.

P. FRANTZ.
WIRE FENCE STAY MACHINE.

No. 592,727.  Patented Oct. 26, 1897.

Witnesses:
J. H. Lillibridge
E. Behel.

Inventor:
Peter Frantz
by A. O. Behel
Atty.

(No Model.) 6 Sheets—Sheet 2.
P. FRANTZ.
WIRE FENCE STAY MACHINE.
No. 592,727. Patented Oct. 26, 1897.
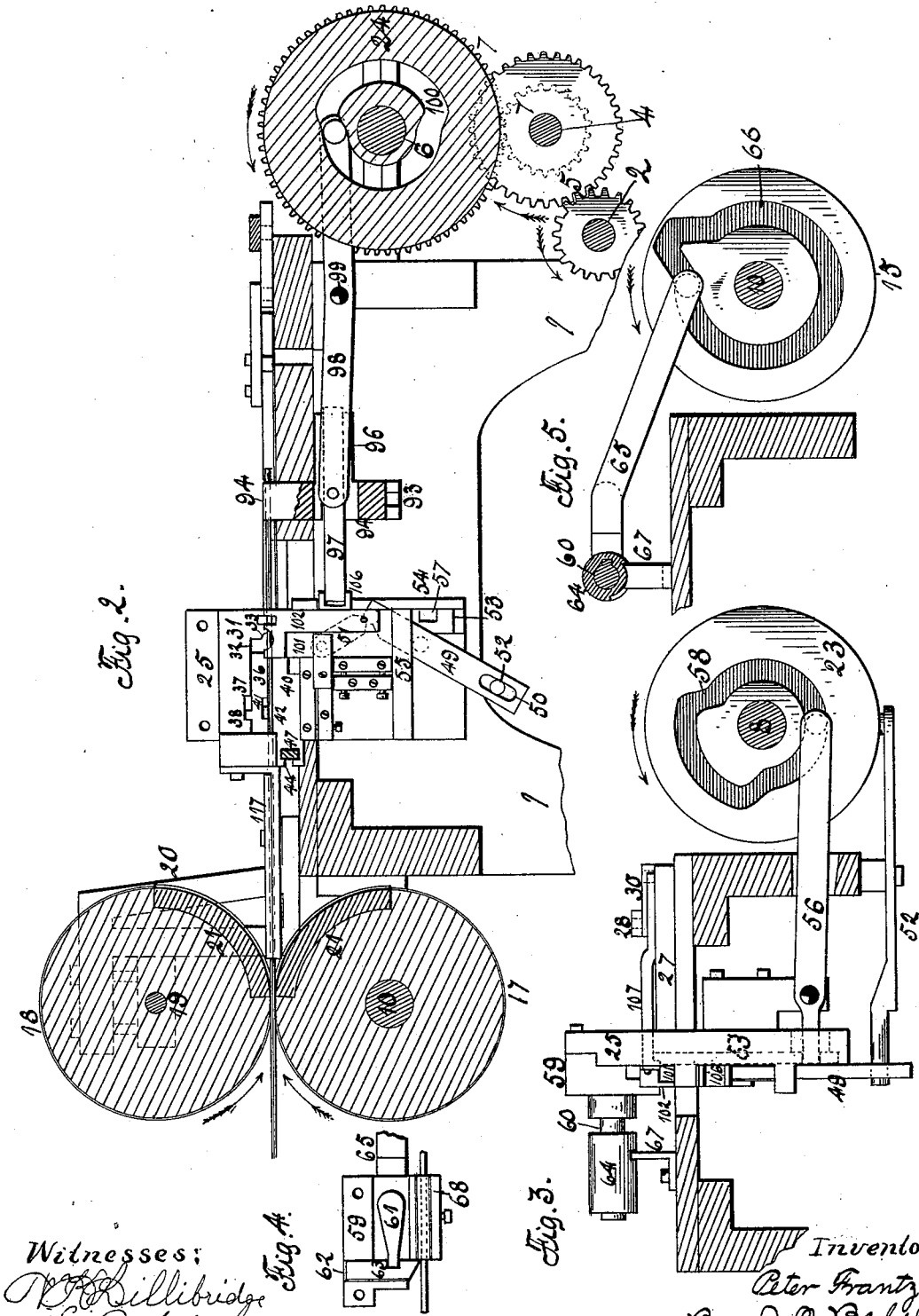
Witnesses:
W. J. Lillibridge
E. Behel
Inventor:
Peter Frantz
By A. O. Behel
Atty.

(No Model.) 6 Sheets—Sheet 3.
P. FRANTZ.
WIRE FENCE STAY MACHINE.
No. 592,727. Patented Oct. 26, 1897.
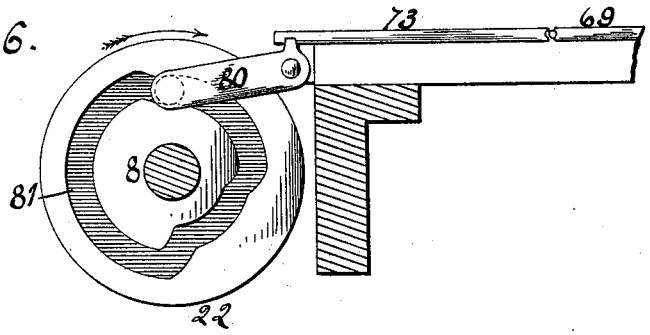
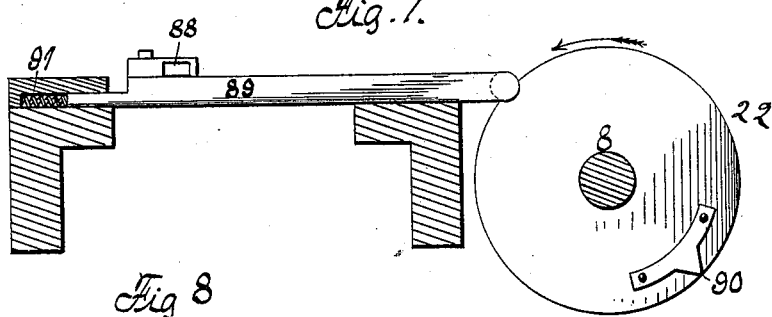
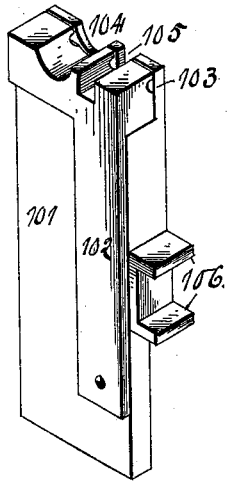
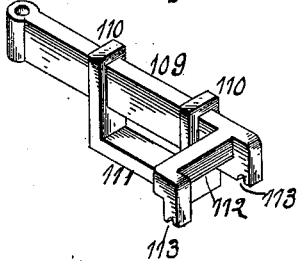
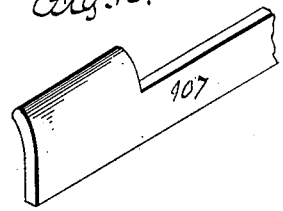
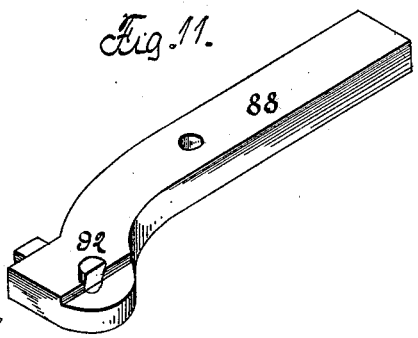
Witnesses:
W. H. Lillibridge
E. Behel
Inventor:
Peter Frantz
By A. O. Behel
Atty.

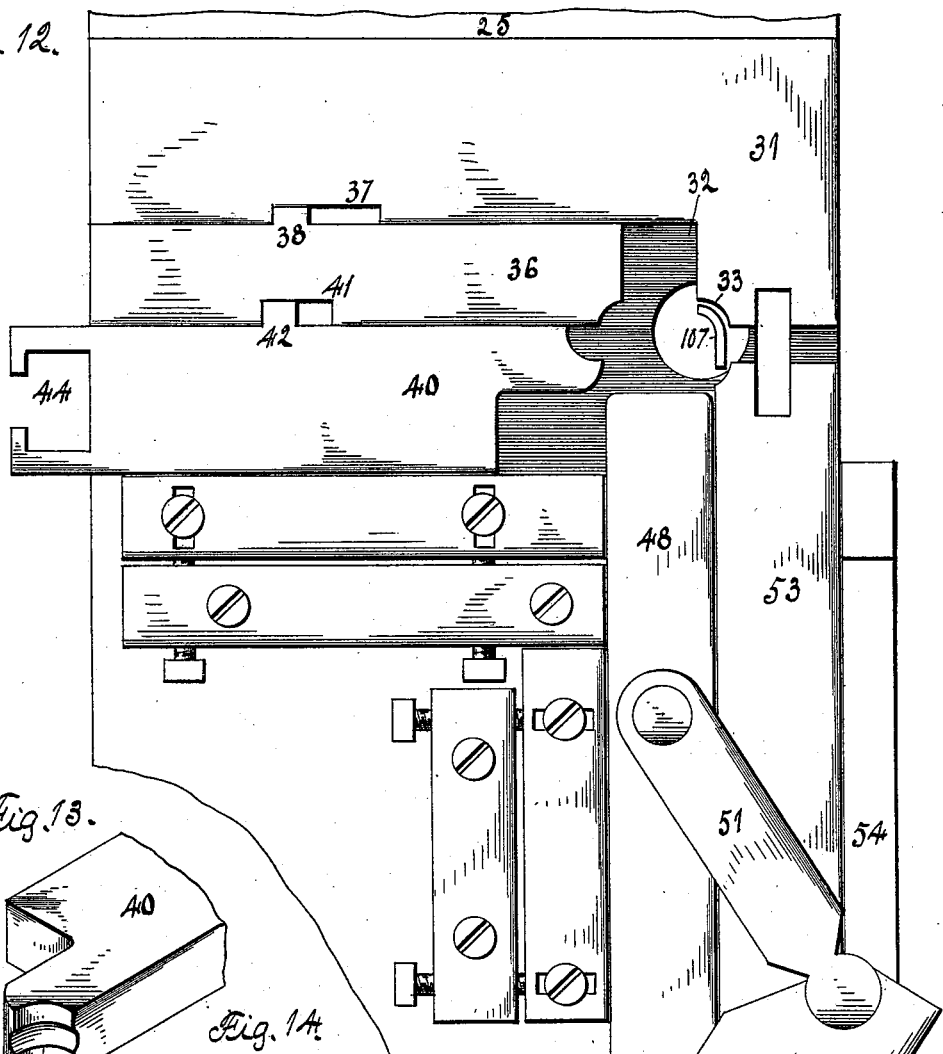

(No Model.) 6 Sheets—Sheet 5.
P. FRANTZ.
WIRE FENCE STAY MACHINE.
No. 592,727. Patented Oct. 26, 1897.
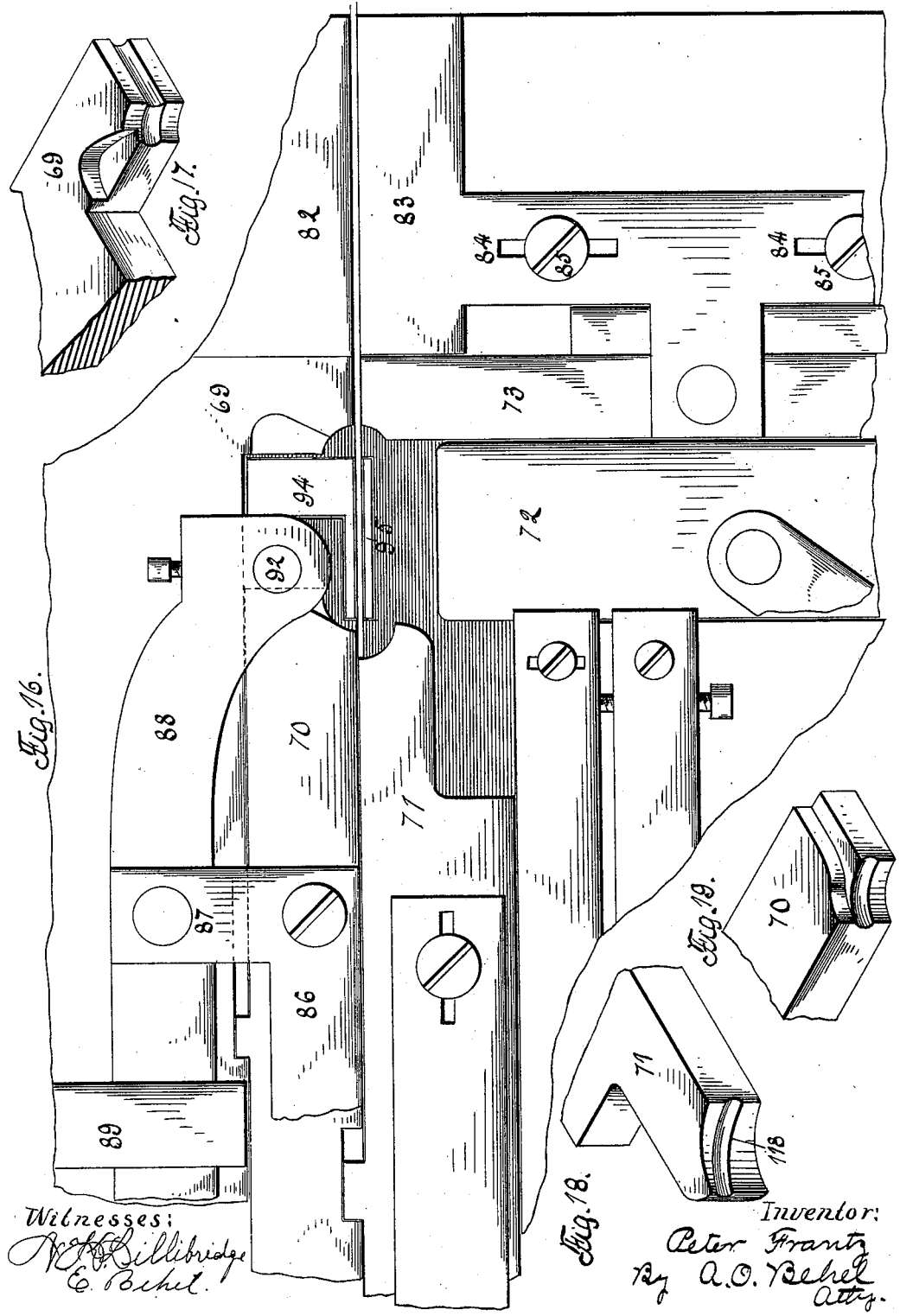
Witnesses:
W. H. Billibridge
E. Behel.
Inventor:
Peter Frantz
By A. O. Behel
Atty.

(No Model.) 6 Sheets—Sheet 6.
P. FRANTZ.
WIRE FENCE STAY MACHINE.
No. 592,727. Patented Oct. 26, 1897.

Witnesses:
Inventor:
Peter Frantz
By A. O. Behel
Atty.

UNITED STATES PATENT OFFICE.

PETER FRANTZ, OF MOUNT MORRIS, ILLINOIS, ASSIGNOR TO THE CHAIN STAY FENCE COMPANY, OF SAME PLACE.

WIRE-FENCE-STAY MACHINE.

SPECIFICATION forming part of Letters Patent No. 592,727, dated October 26, 1897.

Application filed March 18, 1897. Serial No. 628,214. (No model.)

*To all whom it may concern:*

Be it known that I, PETER FRANTZ, a citizen of the United States, residing at Mount Morris, in the county of Ogle and State of Illinois, have invented certain new and useful Improvements in Wire-Fence-Stay Machines, of which the following is a specification.

The object of this invention is to automatically construct a wire-fence stay having one end in eye or hook form and its other end being in loop form having a tongue extending substantially parallel with the length of the stay.

This invention consists in the construction and location of the dies for forming the ends of the stay and in the means for operating them.

Figure 1:
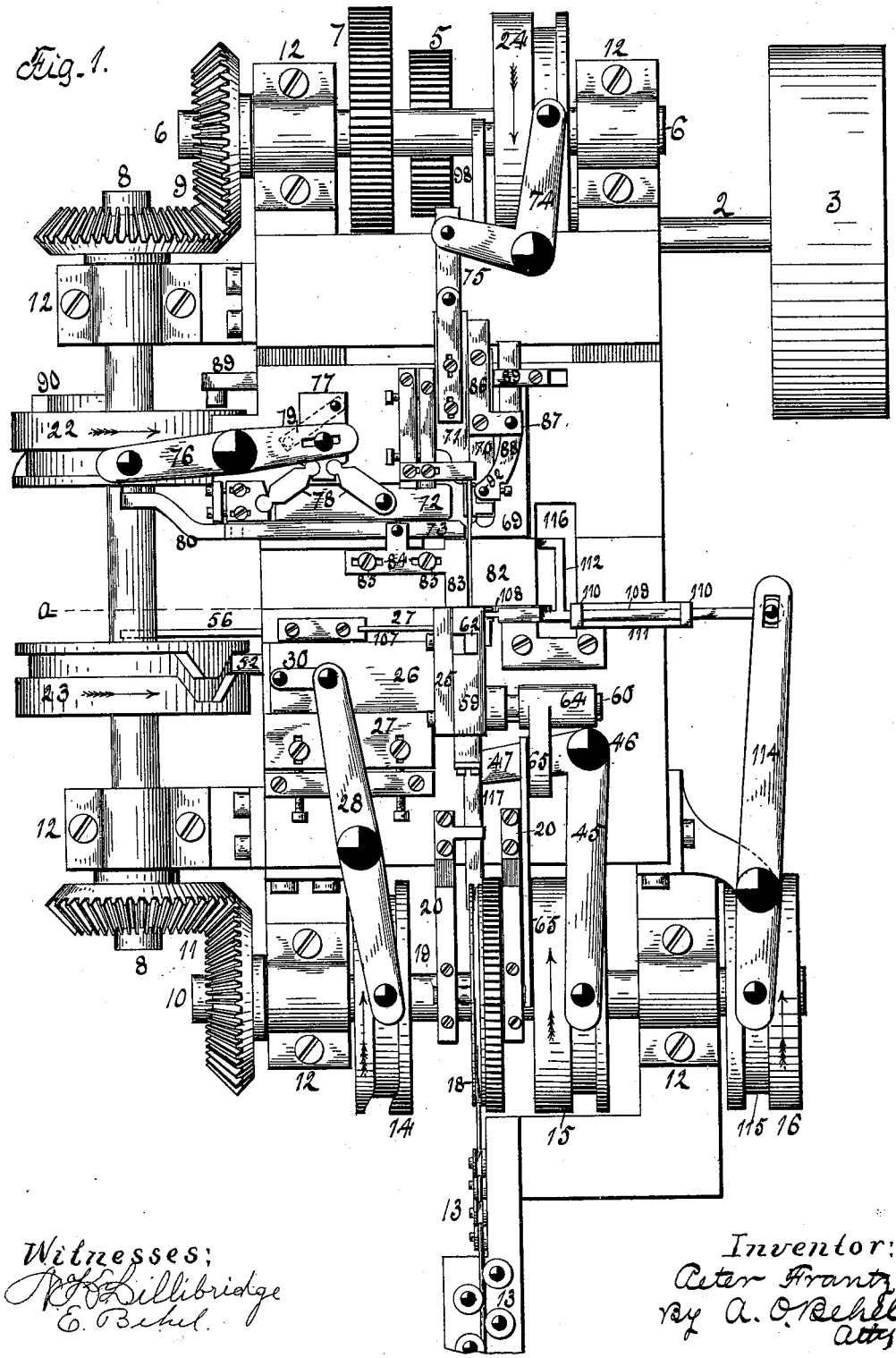
Figure 20:
Figure 21:
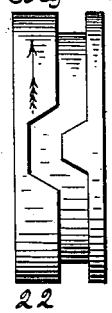
Figure 22:
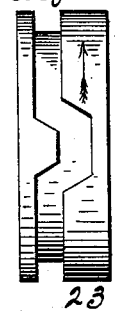
Figure 31:
Figure 32:
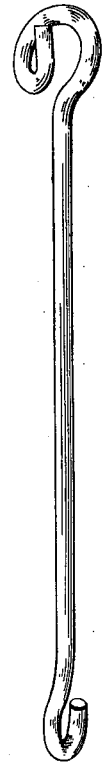

In the accompanying drawings, Figure 1 is a plan view of my improved fence-stay machine. Fig. 2 is a lengthwise vertical central section. Fig. 3 is a transverse vertical section on dotted line $a$ of Fig. 1. Fig. 4 is a face view of the knife and its support. Fig. 5 is a partial section and elevation of the knife-operating means. Fig. 6 is an elevation of the cam-wheel 22 and gripping-jaw 73. Fig. 7 is an elevation of the cam-wheel 22 and sliding bar 89. Fig. 8 is an isometrical representation of the wire-guide for the vertical dies. Fig. 9 is an isometrical representation of the carrier. Fig. 10 is an isometrical representation of the bar 107. Fig. 11 is an isometrical representation of the bender. Fig. 12 is a face elevation of the vertical set of dies. Fig. 13 is an isometrical representation of the end of the movable section 40 of the vertical dies. Fig. 14 is an isometrical representation of the movable section 36 of the vertical dies. Fig. 15 is an isometrical representation of the stationary portion of the vertical dies. Fig. 16 is a plan view of the horizontal dies and bender. Fig. 17 is an isometrical representation of the stationary portion of the horizontal dies. Fig. 18 is an isometrical representation of the movable section 71 of the horizontal dies. Fig. 19 is an isometrical representation of the movable section 70 of the horizontal dies. Figs. 20, 21, 22, 23, 24, and 25 are face views of the cam-wheels 24, 22, 23, 14, 15, and 16, respectively. Figs. 26, 27, 28, 29, 30, and 31 are views of the stay, showing the different steps of bending. Fig. 32 shows a modification of a completed stay.

The mechanism for forming my fence-stay is mounted upon a framework supported upon legs 1. The mechanical parts are in two sections, one section located in a vertical plane and the other in a horizontal plane, in order that the eye or hook at one end of the stay may be formed at right angles to the loop of the other end, both ends of the stay being formed simultaneously.

The main driving-shaft 2 is supported by the main frame and is driven by a belt connection with a pulley 3. This shaft has a connection with a shaft 4 by gear-wheels 5, and this shaft drives a shaft 6 by gear-wheels 7, and this shaft 6 has a connection with a shaft 8 through the medium of miter-toothed wheels 9, and this shaft 8 has a connection with a shaft 10 by miter gear-wheels 11. All of these shafts are supported by suitable bearings 12, secured to the main frame.

A wire-straightener, consisting of the rollers 13, is located at one end of the frame, which I term the "head end." The shaft 10 supports these cam-wheels 14, 15, and 16, also the lower section 17 of the wire-feeding device. The upper section 18 of the feeding device is supported upon a shaft 19, held in bearings 20, extending from the main frame. This feeding device consists of two wheels having their peripheries grooved, each wheel having a section 21 of greater diameter than the main portion of the wheel, in order to determine the length of wire fed to the machine. As the wheels are constantly revolved by gear connection the wire will only be fed during the time the enlarged portion of the wheels are in contact with it.

The shaft 8 supports cam-wheels 22 and 23 and the shaft 6 supports a cam-wheel 24.

The dies for the head end of the machine will now be explained. A vertical block 25 has a horizontal guide 26, fitted to move transversely of the machine in guideways 27, and an arm 28 has a pivotal connection with the main frame between its ends, one end engaging the cam-groove 29 of the cam-wheel 14, and its other end having a connection with the guide 26 through the medium of the link 30.

Figure 23:
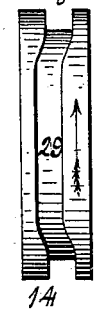
Figure 24:
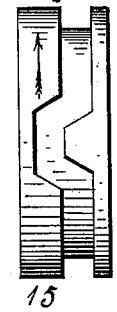
Figure 25:
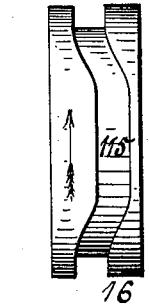
Figure 26:
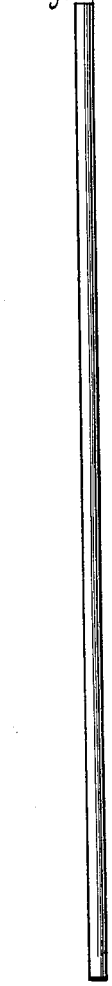
Figure 27:
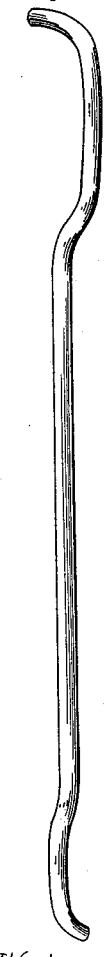

The rotation of this cam-wheel 14 will impart a reciprocating movement to the slide, a detached view of the cam-wheel being shown at Fig. 23. This head supports the dies and is shown full-sized at Fig. 12. The stationary portion 31 of the dies is permanently secured to the upper end of the head, having a portion of its lower face provided with a recess 32 and its extreme lower end (shown at Fig. 15) having its inner corner formed with a segmental notch 33, the notch and lower portion provided with semicircular grooves 34 and 35. Within the recessed portion 32 of the stationary portion of the die is located a movable section 36 of the die, having a connection with the stationary portion by the recess 37 and projection 38. The inner end of this section is shown at Fig. 14, having a semicircular groove 39. Beneath this movable section is located a movable section 40, these two sections having a connection by the recess 41 and projection 42, a detachable view of the inner end of this latter section being shown at Fig. 13, in which the semicircular groove 43 is represented. The outer end 44 of this section is in hook form. An arm 45 has a pivotal connection with the main frame at 46, one end operated upon by the cam-wheel 15, and its inner end 47, turned at right angles to its main portion, engages the outer hooked end 44 of the movable section 40 of the dies, imparting a reciprocating movement to the section.

At right angles to the above-enumerated movable sections 36 and 40 of the die is located a plunger 48, capable of a vertical sliding movement in suitable guideways, having its upper end slightly rounded. A lever 49 has a pivotal connection with the head, its lower end provided with a lengthwise slot 50 and its upper end having a connection with the plunger by the link 51. To the under face of the main frame is pivoted an arm 52, its outer end being operated upon by the cam-wheel 23 and its inner end being located in the lengthwise slot of the lever 49, by which connection a reciprocating movement is imparted to the plunger. A gripping-jaw 53, supported by the head by lying alongside the plunger and an edge 54 of the head and a bar 55 overlying it, is made vertically movable by an arm 56, having a pivotal connection with the head, having its inner end extending through an opening in the head and located in an opening 57 in the lower end of jaw, the outer end of the arm being operated upon by the cam-groove 58 in the face of the cam-wheel 23. The upper end of this jaw has a semicircular groove.

To the face of the head is secured a cap 59, supporting a shaft 60, extending transversely of the machine and provided with a right-angled extension 61. (See Fig. 4.) A vertically-movable knife 62 is supported by the cap and is moved by the end of the extension entering the recess 63 in the knife. The shaft 60 has a feather connection with a collar 64, from which extends an arm 65, operated upon by the cam-groove 66 in the face of the cam-wheel 15. The collar is held from movement in the lengthwise direction of the shaft 60 by a bracket 67, extending from the main frame and its upper end located in a recess formed in the under face of the collar, as shown in Figs. 3 and 5. When the arm 65 is operated by its cam-wheel, it will rock the shaft 60, which in turn will move the knife. A guideway 68 for the wire forms a part of the cap and also the lower section of the knife. Some distance from this set of dies and toward the other end of the machine is located a similar set of dies, but in a horizontal plane instead of a vertical plane. The stationary part 69 of this set corresponds with the stationary part of the vertical set, and the movable sections 70 and 71 with the movable sections 36 and 40 of the vertical set, the plunger 72 with the plunger 48, and the gripping-jaw 73 with the jaw 53. The movable section 71 is operated by a bell-crank 74, having a pivotal connection with the main frame, one end having a connection with the section through the medium of the link 75 and the other end having a connection with the cam-wheel 24.

The plunger is operated by an arm 76, having a pivotal connection with the main frame, one end moved by the cam-wheel 22 and the other end pivoted to a plate 77, to which are connected toggle-levers 78, one connected to a stationary support and the other to the plunger. The plate has a swinging connection with the main frame by the link 79, in order that it may move in a proper direction to operate the toggle-levers.

The gripping-jaw 73 is operated by a lever 80, having a pivotal connection with the main frame, one end moved by connection with the cam-groove 81 in the face of the cam-wheel 22, its other end turned at right angles to its main portion and entering a recess in the under face of the jaw. (See Fig. 6.)

The space between the gripping-jaws of the two sets of dies is filled by a clamp, the section 82 being stationary and the section 83 being movable and having a connection with the jaw 73, so as to move in unison therewith, the slots 84 and screws 85 forming its guide.

To the section 70 of the horizontal set of dies is secured a bar 86, having an extension 87, overlying a bender 88, which has a depending stud forming the pivotal support of the bender, which is bodily movable with the section. This bender has a movement upon its pivotal support by one end passing through an opening in a transverse movable bar 89, which is operated upon by a cam 90 on the face of the cam-wheel 22, and a spring 91 holds the bar in position to be operated upon by its cam. (See Fig. 7.) The free end of this bender has a depending stud 92, flattened on one face, as shown at Fig. 11, and is located near the point where the loop is formed.

A guide for the wire is located near the place where the eye and loop are formed and are raised and lowered simultaneously. From the under face of the main frame depend guideways 93, forming a support for the guide 94, which has its upper face provided with a lengthwise groove 95, and its lower portion has a horizontal guideway 96 for the bar 97. To this bar 97 is pivoted an arm 98, which also has a pivotal connection at the point 99 with the main frame, and its extreme outer end is operated upon by the cam-groove 100 in the cam-wheel 24.

Over the face of the plunger 48 and gripping-jaw 53 of the vertical set of dies is located a wire guide (shown in detail at Fig. 8) consisting of a main portion 101 and a section 102, riveted to the main portion at its lower end, but in a manner to allow a spring action. The upper end of this spring-section has a horizontal opening 103 and the upper end of the complete guide has transverse grooves 104 and 105. From the edge of the main section of this guide extend projections 106, forming a recess within which is located the end of the bar 97.

To the upper face of the main frame is secured a bar 107 (shown in detail at Fig. 10) having its free end enlarged and located in an opening in the head 25, supporting the vertical set of dies, and a projection 108 is secured to the upper face of the main frame and extends into the opening 105 in the wire-guide for the vertical dies.

A carrier for the finished stay consists of the main portion 109, guided in ears 110, rising from the bracket 111, secured to the main frame. The inner end of this main portion has a transverse bar extension 112, its free end being turned down, as is also the end of the main portion 109, and both provided with notches 113. To the outer end of the bar 109 is pivoted an arm 114, which has a pivoted connection with the main frame and is moved by having a connection with the cam-groove 115 of the cam-wheel 16. This cam-wheel will impart a reciprocating motion to the carrier to and from the center of the machine. An opening 116 is formed through the main frame through which the completed stays are dropped.

Figure 28:
Figure 29:
Figure 30:

The wire from which the stays are made is fed in between the straighteners and the feed-wheels 17 and 18, through the guide 117, and through the guides 68 and 101 and between 82 and 83 until its end rests against the end of the section 71 of the horizontal dies. The gripping-jaws 83 and 73 then close upon the wire, holding it in position, when the knife descends and cuts off the wire. The guides 94 and 101 are dropped and the wire is released from the guide 101 by the spring-section 102 opening. It will be noticed that when the knife is in position to cut the wire the vertical set of dies are to one side of the wire and as the cut section of wire is held stationary by its clamps it is necessary that the vertical set of dies be moved in line with the wire. This is accomplished by the cam-wheel 14 operating upon the head carrying the dies through the arm-and-link connection, and jaw 53 clamps the wire. This movement of the head also carries the guide 68. The feather connection between the knife-shank 60 and the collar 64 allows the sliding movement of the knife without breaking the connection with its operating means. The bar 107 and projection 108, one on each side of the wire, serve to hold it until properly located within the vertical dies. The two sets of dies are operated in unison, the first movement being of the plungers 48 and 72, which will impart to the wire the bends shown at Fig. 27. These plungers are then withdrawn and the movable sections 40 and 71 of the dies are then moved until their projections, which connect with the section 36 and 70, come in contact with the end of their recesses, which will give the ends of the wire a further bend, as shown at Fig. 28. Both movable sections of the dies will then move together a short distance, forming the bend, as shown at Fig. 29, and a further movement will complete the eye made by the vertical dies and leave the loop made by the horizontal dies in the condition shown at Fig. 30. It will be noticed that the groove 118 in the section 71 of the horizontal set of dies is on an incline, which causes the wire to overlap or cross the main portion. The bender 88 is then moved upon its pivotal support, which will come in contact with that end of the loop and bend it until it lies substantially parallel with the main portion, as shown at Fig. 31. The parts of the dies are returned to their normal position and the vertical set is moved free of the wire. The carrier is moved so that the recesses 113 will overlie the wire stay. Then the gripping-jaws are retracted, which will liberate the stay, and the guides 94 and 102 are then raised, which will raise the stay free of the clamps and into the carrier, when the carrier will be moved, carrying the stay over the opening 116, through which it is discharged, and during the discharging of the stay the wire is again fed in to form a new stay. The gripping-jaws 73 and 83 have three movements. After the stay has been formed they open wide enough to permit the discharge of the stay, then close part way, so as to form a guide for the wire while being fed in, and finally firmly clamp the wire. The connection between the movable section 36 and 71 of the dies and the stationary portions is to permit a forward movement of the sections in forming the eye and to prevent the retracting movement when the plungers are making the first bend in the wire.

At Fig. 32 the eye formed by the vertical set of dies is somewhat open, which is accomplished by the formation of the groove 43 in the movable section 40 of the dies.

In the drawings is shown adjustable means for taking up the wear in the various sliding sections of the machine, which I have not deemed necessary to particularly describe.

I claim as my invention—

1. The combination of a wire-feeding device and two sets of dies, one set made bodily movable in and out of the line of feed.

2. The combination of a wire-feeding device, two sets of dies, and a knife, one set of dies and knife made bodily movable in and out of the line of feed.

3. The combination of a wire-feeding device and two sets of dies located at right angles to each other, one set made bodily movable in and out of the line of feed.

4. The combination of a wire-feeding device, two sets of dies, and a knife, one set of dies and knife made bodily movable in and out of the line of feed, and means holding the cut wire in position to be received by the movable set of dies.

5. The combination of a wire-feeding device, two sets of dies, one set made bodily movable in and out of the line of feed, and a guide for the wire for each set, both guides made vertically movable, and one having a yielding section.

6. The combination of a set of dies consisting of a stationary portion, a plunger, and two movable sections having a sliding connection with each other to produce sequence of action, the faces of the stationary portion and movable section being grooved.

7. The combination of a set of dies, consisting of a gripping-jaw, a stationary portion, a plunger, and two movable sections having a connection with each other, the plunger first movable then one section and finally both sections in unison, the faces of the jaw, stationary portion and sections being grooved.

8. The combination of a set of dies, consisting of a stationary portion, a plunger, and two movable sections, the plunger movable first, then one section and finally both sections in unison, the faces of the stationary portion and sections being grooved, and the groove of the first movable section being on an incline.

9. The combination of a set of dies consisting of a stationary portion, a plunger, and two movable sections, the plunger movable first, then one section, and finally both sections in unison, the faces of the stationary portion and sections being grooved, the groove of the first movable section being on an incline, and a movable bender.

PETER FRANTZ.

Witnesses:
CHAS. NEWCOMER,
C. W. LAHMAN.